United States Patent [19]

Miyamura et al.

[11] Patent Number: 4,537,826
[45] Date of Patent: Aug. 27, 1985

[54] ELECTROCHROMIC DISPLAY ELEMENT

[75] Inventors: Masataka Miyamura, Kamakura; Masanori Sakamoto, Kawasaki; Yuko Nakajima, Tokyo, all of Japan

[73] Assignee: Tokyo Shibaura Denki Kabushiki Kaisha, Kawasaki, Japan

[21] Appl. No.: 502,322

[22] Filed: Jun. 8, 1983

[30] Foreign Application Priority Data

| Jun. 29, 1982 [JP] | Japan | 57-110863 |
| Jun. 29, 1982 [JP] | Japan | 57-110864 |
| Nov. 24, 1982 [JP] | Japan | 57-204520 |

[51] Int. Cl.³ .............. B32B 15/04; C09K 1/10; G02F 1/17
[52] U.S. Cl. .............. 428/328; 428/330; 428/331; 428/413; 428/448; 428/450; 428/451; 428/462; 428/463; 428/460; 428/480; 428/522; 428/524; 428/523; 428/913; 428/917; 428/702; 340/785
[58] Field of Search .............. 428/328, 330, 331, 413, 428/448, 450, 451, 460, 463, 462, 480, 522, 524, 523, 913, 917, 702

[56] References Cited

U.S. PATENT DOCUMENTS

| 3,280,036 | 10/1966 | Howell | 252/62.1 |
| 4,275,103 | 6/1981 | Tsubusaki et al. | 428/128 |
| 4,279,961 | 7/1981 | Fujioka et al. | 428/328 |

FOREIGN PATENT DOCUMENTS

| 0146420 | 11/1980 | Japan | 428/702 |
| 0146421 | 11/1980 | Japan | 428/702 |
| 0146422 | 11/1980 | Japan | 428/702 |
| 0142319 | 8/1983 | Japan | 428/702 |

OTHER PUBLICATIONS

Dautremont-Smith et al., Appl. Phys. Lett., 35 (7), Oct. 1, 1979.

Primary Examiner—Patricia C. Ives
Attorney, Agent, or Firm—Schwartz, Jeffery, Schwaab, Mack, Blumenthal & Evans

[57] ABSTRACT

Disclosed is an electrochromic display element having an electrochromic material layer and an ion-conductive material layer being in contact therewith, characterized in that said electrochromic layer comprises a transition metal oxide and said ion-conductive material layer comprises a light-transmissive organic polymeric resin and an inorganic ion-conductive material.

17 Claims, 1 Drawing Figure

FIG. 1

ELECTROCHROMIC DISPLAY ELEMENT

BACKGROUND OF THE INVENTION

This invention relates to an electrochromic display element, more particularly to an electrochromic display element which is free from occurrence of short-circuit between electrodes, closely contacted with the electrochromic layer, rapid in color forming and extinguishing response and without lowering in display function during usage over a long term.

In the prior art, in an electrochromic display element employing a transition metal oxide in the electrochromic material layer, it has been known to use a liquid ion-conductive material or a solid ion-conductive material as the ion-conductive material layer which is formed in contact with the electrochromic material layer.

As the liquid ion-conductive material, there have been used, for example, electrolytes composed principally of acids with greater cation mobility such as sulfuric acid for the purpose of accelerating the color forming and extinguishing response speed and obtaining good contrast. However, when these are employed over a long term, there is involved the problem that elecrolytes are liable to be leaked out from the electrochromic display element. For this reason, in manufacturing of electrochromic display elements, electrolytes are required to be sealed liquid tight, whereby there is also involved another problem that manufacturing steps become cumbersome to lower working efficiency.

On the other hand, as solid ion-conductive materials, there have been used inorganic ionoconducive materials such as silicon dioxide ($SiO_2$), magnesium fluoride ($MgF_2$), calcium fluoride ($CaF_2$), etc. or organic ion-conductive materials such as perfluorosulfonic acid resin, styrenesufonic acid resin, acrylic resin, etc. However, the former involves the problem that short-circuit is liable to occur between a transparent electrode and a counter-electrode through the pin holes existing in the ion-conductive material layer and the electrochromic material layer. Also, it can be manufactured with poor productivity and therefore is not suitable for practical application. On the other hand, when an organic ion-conductive material such as a polymeric resin is employed, there is the problem that it is poorly contacted at the interface with the electrochromic material layer, whereby ion migration at the interface does not proceed smoothly. Further, there is another problem that small migration speed of cations in an organic ion-conductive material makes speed of color forming and extinguishing response slower, as will take about 2 seconds.

Further, in the electrochromic display element of the prior art, regardless of whether the ion-conductive material may be liquid or solid, hydrogen is generally liable to be generated by the side reactions. For this reason, a metal oxide such as stannic oxide ($SnO_2$) or indium oxide ($In_2O_3$) used as a transparent electrode is reduced with hydrogen to metallic Sn or metallic In. Accordingly, when used over a long term, there is involved the problem that the display portion of the electrochromic display element is unevenly discolored to brown or black by the metallic Sn or the metallic In formed by reduction, whereby display function is lowered.

SUMMARY OF THE INVENTION

An object of this invention is to provide an electrochromic display element which may overcome the above problems, is free from occurrence of short-circuit between electrodes, good in close contact with the electrochromic material layer, rapid in color forming and extinguishing response speed and not lowered in display function without generation of hydrogen during usage over a long term.

The electrochromic display element of this invention is an electrochromic display element having an electrochromic material layer and an ion-conductive material layer being in contact therewith, characterized in that said electrochromic layer comprises a transition metal oxide and said ion-conductive material layer comprises a light-transmissive organic polymeric resin and an inorganic ion-conductive material.

Also, the electrochromic display element of this invention may be one wherein said ion-conductive material layer further contains a plasticizer and/or a pigment.

In the following, this invention will be described in further detail.

BRIEF DESCRIPTON OF PREFERRED EMBODIMENTS

In the drawing;
The FIGURE shows a schematic constitutional illustration of the electrochromic display element according to this invention.

DETAILED DESCRIPTION OF PREFERRED EMBODIMENTS

Figure 1:
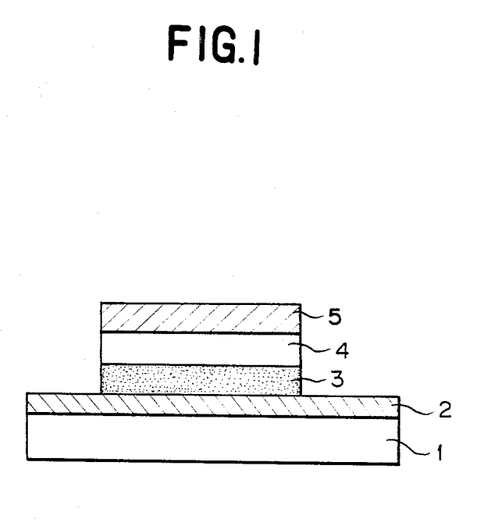

There is shown in the FIGURE an embodiment of the present invention, wherein a transparent electrode (2), an electrochromic material layer (3), an ion-conductive material layer (4) and a counter-electrode (5) are provided on a substrate (1), respectively.

The material constituting the electrochromic material layer according to this invention is not critical, but any transition metal oxide may be used, such as tungsten oxide ($WO_3$), molybdenum oxide ($MoO_3$), titanium oxide ($TiO_2$), and the like.

The materials constituting the ion-conductive material layer according to this invention, which may have a layer thickness of from 0.1 to 100 um, are an organic polymeric resin and an inorganic ion-conductive material. The organic polymeric resin is not critical but any organic polymeric resin having transparency on fabrication into a film may be available. For example, there may be included polystyrene, polyvinyl chloride, a vinyl chloride/vinyl acetate copolymer, polyvinyl acetate, polyvinyl acetal, phenol resin, epoxy resin, alkyd resin, acrylic resin, polyacrylonitrile, butadiene type synthetic rubber and polyolefin. There may be employed one kind or two or more kinds selected from the group consisting of these resins.

The inorganic ion-conductive material is not also specifically limited, so long as it contains $Li^+$ or $Na^+$ which participates in color formation and extinction. For example, there may be included lithium fluoride (LiF), lithium iodide (LiI), lithium hydroxide (LiOH), lithium perchlorate ($LiClO_4$), sodium fluoride (NaF), sodium iodide (NaI), sodium hydroxide (NaOH) and sodium perchlorate ($NaClO_4$), and one kind or two or more kinds selected from the group consisting of these materials may be used. The above inorganic ion-conductive material may be formulated preferably in an amount of 0.01 to 1000% by weight, more preferably 20 to 100% by weight, based on the organic polymeric resin. When the amount of the inorganic ion-conductive material formulated is less than 0.01% by weight, contrast during color formation may be lowered to make display function bad, while at a level exceeding 1000% by weight, film forming chracteristic as a composite material may be lowered to give difficultly an ion-conductive material layer with a uniform composition.

The ion-conductive material layer according to this invention may further contain a plasticizer for the purpose of improving the flexibility to the organic polymeric resin film and the color forming and extinguishing response.

The plasticizer which can be used in this invention may include tricresyl phosphate (TCP), tributyl phosphate (TBP), triethyl phosphate (TED), trioctyl phosphate (TOP), trisdichloropropyl phosphate (CRP), tributoxyethyl phosphate (TBPX), methylacetyl ricinoleate (MAR), octyldecyl phthalate, butyllauryl phthalate (BLP), butylphthalyl butylglycolate (BPBG), butylbenzyl phthalate (BBP), dilauryl phthalate (DLP), dibutyl phthalate (DBP), cyclohexyl phthalate (DCHP), diethyl phthalate (DEP), diisobutyl phthalate (DIBP), diisodecyl phthalate (DIDP), dioctyl phthalate (DOP), dioctyl adipate (DOA), diisodecyl adipate (DIDA), octyldecyl adipate (ODA), dibutyl sebacate (DBS), tributyl citrate, acetyltributyl citrate, triethyl citrate, acetyltriethyl citrate, di-2-ethylhexyl maleate (DOM), dibutyl fumarate, polyethylene glycol (PEG), etc. One or more of these may be used ; a mixture of BPBG and PEG, for example.

The amount of the plasticizer may appropriately be within the range of from 1 to 100% by weight, preferably 5 to 70% by weight, based on the polymeric resin. When the amount of the plasticizer formulated is lower than 1% by weight, no improvement in response characteristic of the element can be observed, whereby no effect of addition of the plasticizer can be exhibited. On the other hand, when it is added in excess of 100%, formation into a thin film is difficult. In this invention, addition of a plasticizer improves flexibility of the polymeric resin film and makes migration of the inorganic ionic material in the polymeric matrix to improve the ion-conductivity, thereby enabling formation of an electrochromic element excellent in response characteristic.

The ion-conductive material layer according to this invention may further contain a pigment for the purpose of improving the display function and imparting a beautifying effect.

The pigment to be used in this invention may be exemplified by white pigments such as titanium dioxide ($TiO_2$), aluminum oxide ($Al_2O_3$), magnesium oxide (MgO), zirconium oxide ($ZrO_2$), yttrium oxide ($Y_2O_3$), tantalum pentaoxide ($Ta_2O_5$) and silicon dioxide ($SiO_2$), and coloring pigment such as nickel titanium yellow, cadmium yellow, chromium yellow, cadmium red, molybdenum orange and colcothar. One kind or two or more kinds selected from the group consisting of these may be employed. Among them, it is particularly preferable to use a white pigment from the standpoint of the beautifying effect.

The above pigment may be formulated preferably in an amount of 5 to 50% by weight, more preferably 10 to 30% by weight, based on the organic polymeric resin. When the amount of the pigment formulated is less than 5% by weight, the color of the background can be thinly seen through to give no sufficient beautifying effect. On the other hand, at a level exceeding 50% by weight, the film forming characteristic and ion-conductivity of the ion-conductive material layer may be lowered.

Other materials to be used in this invention may include those conventionally used in electrochromic display elements. As the substrates, there may be employed, for example, transparent materials such as glasses, polyesters, etc. As the transparent electrode and the counter-electrode, there may be employed, for example, $In_2O_3$, $SnO_2$, Au, etc.

The electrochromic display element of this invention constituted by use of the above materials may be prepared according to, for example, the following procedures:

Namely, a transparent electrode is first formed on a substrate by using a conventional method such as sputtering. Then, on the aforesaid transparent electrode is formed an electrochromic material layer by using a method such as vapor deposition. For formation of an ionoconducive material layer, first an organic polymeric resin and an inorganic ion-conductive material are formulated in predetermined amounts, or optionally with further addition of a pigment thereto, to prepare a dispersed and mixed product. The mixture may be diluted with an appropriate solvent, if necessary, or an organic polymeric resin previously diluted with an organic solvent may be used so as to control its viscosity, and then ready for coating on an electrochromic material layer by using, for example, the spinning coating method, the dipping method, the roller coating method or the spray coating method. When a solvent is used, for the purpose of removing the solvent remaining in the thin film, it is preferred to apply a heating treatment at a temperature range of from 50° to 150° C.

As the solvent to be used for controlling the viscosity of the above ion-conductive material, there may be included non-aqueous solvents such as methyl ethyl ketone (MEK), methyl isobutyl ketone (MIBK), toluene, xylene, cresol, ethylcellosolve acetate, butylcellosolve acetate, propylene carbonate, acetonitrile, dimethylacetamide, N-methylpyrrolidone, and dimethylformamide, and one kind or two or more kinds selected from the group consisting of these solvents may be employed.

The above organic solvent may be formulated in an amount, which may preferably be selected suitably depending on the use as well as the preparation method during film formation of the composition of this invention, and it may be preferably employed in an amount so that the resin concentration may be within the range from 2 to 20% by weight.

Next, a counter-electrode is formed on the ion-conductive material layer by using a method such as sputtering similarly as in formation of the transparent electrode, to give the electrochromic display element of this invention.

Since the ion-conductive material layer is formed according to a coating method, the electrochromic display element of this invention is free from generation of pin holes and the like, and therefore free from occurrence of short-circuit between electrodes. Also, due to good close contact between the electrochromic material layer and the ion-conductive material layer, response of color forming and extinguishing is rapid. Further, the electrochromic display element of this invention, since color formation and exinction are effected by inorganic ions such as Li+ or Na+ in the ion-conductive material layer, suffers from no generation of hydrogen during usage over a long term, thus having an advantage of substantially no lowering of display function. Moreover, it is possible to prepare an electrochromic display element having better response characteristic by adding plasticizer to the above-mentioned ion-conductive material layer.

The electrochromic display element of this invention having the advantges as mentioned above can also be prepared, in manufacturing thereof, to have a uniform thin film ion-conductive material layer according to a simple step.

This invention will be described in a greater detail by the following example:

REFERENTIAL EXAMPLES 1 TO 10

(Preparation of ion-conductive material layer constituting the invention)

As organic polymeric resins were employed polymethylmethacrylate (PMMA) and polystyrene (PSt), and the organic solvents as shown in Table 1 were added thereto to dissolve these polymers therein. Then, the inorganic ion-conductive materials as shown in Table 1 were added to the solutions, followed by mixing by means of a ball mill, to obtain 10 kinds of compositions for forming the ion-conductive material layer.

With the use of each of the above 10 kinds of the compositions, an ion-conductive thin film having respective film thickness was formed on a borosilicate glass substrate according to the method as shown in the Table, and dried under the conditions of 100° C.×30 minutes.

Conductivity of each ion-conductive thin film obtained by the above treatment was measured according to the conventional method by means of a direct current conductivity measuring device (produced by Horiba Seisakusho Co., Ltd.). The results are shown together in Table 1.

REFERENTIAL COMPARATIVE EXAMPLES 1 AND 2

As comparative examples to the above referential examples, there were employed samples which were prepared from NAFION (trade name, produced by Du Pont Co.) as also shown in Table 1 to form as ion-conductive thin films.

For each of these two kinds of ion-conductive thin films, conductivity was measured according to the same method as in Examples. The results are shown together in Table 1.

TABLE 1

| | Organic polymer resin | Organic solvent Kind | Organic solvent Amount* | Inorganic ion-conductive material Kind | Inorganic ion-conductive material Amount* | Coating Method | Film thickness ($\mu$m) | Conductivity ($\Omega^{-1} \cdot cm^{-1}$) |
|---|---|---|---|---|---|---|---|---|
| Referential Example 1 | PMMA | Methyl isobutyl ketone | 700 | LiClO$_4$ | 50 | Spinner | 2 | $1 \times 10^{-4}$ |
| Referential Example 2 | " | Methyl isobutyl ketone | 700 | " | 100 | " | 3 | $1 \times 10^{-3}$ |
| Referential Example 3 | " | Methyl isobutyl ketone | 700 | " | 300 | " | 2 | $3 \times 10^{-2}$ |
| Referential Example 4 | " | Toluene | 800 | " | 100 | " | 2 | $2 \times 10^{-3}$ |
| Referential Example 5 | " | Toluene | 800 | LiI | 100 | Bar coater | 1 | $1 \times 10^{-4}$ |
| Referential Example 6 | PSt | Toluene | 1000 | " | 100 | Spinner | 2 | $1 \times 10^{-4}$ |
| Referential Example 7 | PMMA | Methyl isobutyl ketone | 700 | LiF | 200 | " | 5 | $3 \times 10^{-4}$ |
| Referential Example 8 | " | Methyl isobutyl ketone | 700 | " | 100 | " | 10 | $6 \times 10^{-4}$ |
| Referential Example 9 | " | Methyl isobutyl ketone | 700 | NaClO$_4$ | 50 | " | 3 | $2 \times 10^{-3}$ |
| Referential Example 10 | " | Methyl isobutyl ketone | 700 | " | 300 | " | 2 | $1 \times 10^{-2}$ |
| Referential Comparative Example 1 | NAFION | water | 1 | — | — | — | 50 | $1 \times 10^{-10}$ |
| Referential Comparative Example 2 | " | water | 10 | — | — | — | 30 | $1 \times 10^{-7}$ |

*Each amount represents weight % based on the organic polymeric resin.

As apparently seen from Table 1, while the ion-conductive films formed by use of the ion-conductive compositions of Referential Comparative Examples show conductivities which are as low as $10^{-10}$ to $10^{-6}$ $\Omega^{-1}.cm^{-1}$, the ion-conductive films formed by use of the ion-conductive compositions used in this invention are all confirmed to have higher conductivities of $10^{-6}$ to $10^{-2}$ $\Omega^{-1}.cm^{-1}$.

Also, the ion-conductive films formed by use of the ion-conductive compositions used in this invention are confirmed to have good light-transmissivities as well as good film forming characteristics.

EXAMPLES 1 TO 10

On a glass plate was formed a transparent electroconductive film comprising $In_2O_3$ by the sputtering method, and after patternization of said electroconductive film so as to afford desired displays, a tungsten oxide was vapor deposited to a thickness of 0.3 μm on the electroconductive film.

Thereafter, 10 kinds of compositions for formation of ion-conductive material layer as shown in Table 2 were prepared. That is, to a solution of each organic polymeric resin dissolved in a suitable solvent was added a predetermined amount of an inorganic ion-conductive material and dispersed thoroughly therein by means of a ball mill and three rolls.

On the substrate having the $WO_3$ film as described above, the aforesaid compositions were coated by use of the respective coating methods of the dipping method, the spinning method, the spraying method and the roller method indicated in Table 1. Then, each substrate was left to stand on an iron plate heated to 100° C. for about 30 minutes for drying to prepare a thin film of a homogeneous ion-conductive material layer.

On each ion-conductive material layer was formed $In_2O_3$ to a thickness of 0.2 μm by sputtering to provide a counter-electrode.

For each substrate obtained by the above treatment, an epoxy resin was sealed in vacant portions thereof and hardened to obtain 10 kinds of electrochromic display elements.

COMPARATIVE EXAMPLES 1 AND 2

As comparative examples, two kinds of electrochromic display elements were obtained according to the same procedure as in Examples 1 to 10 except for using ion-conductive membranes NAFION (trade name, produced by Du Pont Co.) as shown in Table 2 in the ion-conductive material layer.

For the respective electrochromic display elements obtained in the the above Examples 1 to 10 and Comparative Examples 1 and 2, the voltages and response times required for the contrast ratio [ratio of absorbance at the time of color formation by He-Ne laser (633 nm) to absorbance at the time of extinction] of 3 were examined. The results are shown together in Table 2.

TABLE 2

| | Organic polymeric resin | Organic solvent | Inorganic ion-conductive material | | Formation conditions | | Driving voltage (V) | Response time (msec) |
|---|---|---|---|---|---|---|---|---|
| | | | Kind | Amount* | Coating method | Film thickness (μm) | | |
| Example 1 | Polymethyl methacrylate | Methyl isobutyl ketone | $LiClO_4$ | 100 | Dipping | 2 | 2.0 | 700 |
| Example 2 | Polymethyl methacrylate | Methyl isobutyl ketone | $LiClO_4$ | 300 | Spinning | 2 | 1.5 | 500 |
| Example 3 | Polymethyl methacrylate | Methyl isobutyl ketone | LiOH | 50 | Spray | 0.8 | 3.0 | 900 |
| Example 4 | Polymethyl methacrylate | Methyl isobutyl ketone | LiF | 10 | Spray | 0.5 | 3.0 | 700 |
| Example 5 | Polymethyl methacrylate | Methyl isobutyl ketone | LiI | 10 | Spray | 0.5 | 2.0 | 400 |
| Example 6 | Polystyrene | Toluene | $LiClO_4$ | 100 | Spinning | 1 | 2.0 | 600 |
| Example 7 | Polystyrene | Toluene | $LiClO_4$ | 300 | Dipping | 4 | 3.0 | 600 |
| Example 8 | Polyvinyl acetate | Toluene | $LiClO_4$ | 300 | Spray | 0.2 | 1.5 | 300 |
| Example 9 | Methyl methacrylate-methacrylic acid copolymer | Toluene | $LiClO_4$ | 100 | Roller | 1.5 | 2.0 | 500 |
| Example 10 | Methyl methacrylate-methacrylic acid copolymer | Toluene | $LiClO_4$ | 300 | Spinning | 1.5 | 2.0 | 400 |
| Comparative example 1 | NAFION | — | — | — | — | 50 | 6.0 | 3000 |
| Comparative example 2 | NAFION | — | — | — | — | 30 | 5.0 | 2500 |

*Each amount represents weight % based on the organic polymeric resin.

As apparently seen from Table 2, the electrochromic display elements of Comparative Examples are slow in response speed under a high driving voltage because they have thick electrolyte layers, as contrasted to those of the present invention, each of which was confirmed to be drivable at a low voltage and rapid in response speed.

In addition, in each of the electrochromic diplay elements of this invention, a clear deep blue pattern is displayed by application of a voltage so as to make negative on the display electrode side, and the displayed pattern is extinguished by application of a voltage of the opposite polarity.

Further, the electrochromic element of this invention is free from generation of hydrogen, etc. because of absence of side reactions at the electrodes, thus being confirmed to be electrochemically stable.

EXAMPLES 11 TO 20

The same glass plates as used in Examples 1 to 10 were prepared and electrochromic material layers comprising transparent electrodes and tungsten oxide were formed according to the same method.

Thereafter, ten kinds of the compositions for formation of ion-conductive materials as shown in Table 3 were prepared. That is, to the solutions having respective organic polymeric resins dissolved in appropriate solvents, predetermined amounts of inorganic ion-conductive materials and pigments were added, respectively, followed by sufficient dispersion by means of three rolls.

Subsequently, similarly as in Examples 1 to 10, by using the respective coating methods as shown in Table 3, ion-conductive material layers were formed.

Further, on the respective ion-conductive material layers, there were formed by vapor deposition Ni as counter-electrodes to a thickness each of 0.2 μm, followed by sealing with an epoxy resin in the same manner as in the foregoing Examples, to obtain ten kinds of electrochromic display elements.

For each of the electrochromic display elements obtained in the above Examples 11 to 20, the voltage and the response time required for a contrast ratio of 3 were examined. The results are shown together in Table 3.

pattern is extinguished by application of a voltage of the opposite polarity.

Further, the electrochromic element of this invention is free from generation of hydrogen, etc. because of absence of side reactions at the electrodes, thus being confirmed to be electrochemically stable.

EXAMPLES 21 TO 25

On glass plates were prepared patternized transparent conductive films, on which there were provided tungsten oxide films to the thickness of 0.3 μm by the vapor deposition method. On these films, the compositions as shown in Examples 21 to 25 in Table 1, after being sufficiently dispersed, were coated by a spinner. Then, the coated products were dried under heating at 150° C. for 2 hours for removal of the organic solvents remaining in the solid electrolyte layers. Subsequently, counter-electrodes were provided by vapor deposition of gold. Additionally preparing three kinds of comparative examples as shown in Table 4, eight kinds of the electrochromic elements thus obtained were tested for actuation characteristics to give the results which are also shown in Table 4. Each of the elements obtained

TABLE 3

| | Organic polymeric resin | Organic solvent (Amount*) | Inorganic ion-conductive material | | Pigment | | Forming conditions | | Driving voltage (V) | Response time (msec) |
|---|---|---|---|---|---|---|---|---|---|---|
| | | | Kind | Amount* | Kind | Amount* | Coating method | Film thickness | | |
| Example 11 | Polymethyl methacrylate | Methyl ethyl ketone (500) | LiClO$_4$ | 100 | TiO$_2$ | 20 | Spinning | 2 | 2.5 | 600 |
| Example 12 | Polymethyl methacrylate | Methyl ethyl ketone (1000) | LiClO$_4$ | 300 | ZrO$_2$ | 30 | Spinning | 1 | 1.5 | 500 |
| Example 13 | Polymethyl methacrylate | Methyl ethyl ketone (1000) | LiI | 50 | Y$_2$O$_3$ | 30 | Spinning | 1 | 2.0 | 900 |
| Example 14 | Methyl methacrylate-methacrylic acid copolymer | Methyl ethyl ketone (400) | LiOH | 80 | TiO$_2$ | 20 | Roller | 3 | 2.5 | 700 |
| Example 15 | Methyl methacrylate-methacrylic acid copolymer | Methyl ethyl ketone (1000) | LiI | 40 | TiO$_2$ | 10 | Roller | 2 | 2.0 | 600 |
| Example 16 | Polystyrene | Toluene (2000) | LiF | 100 | ZrO$_2$ | 10 | Dipping | 1.2 | 1.5 | 700 |
| Example 17 | Polystyrene | Toluene (1000) | LiClO$_4$ | 200 | ZrO$_2$ | 20 | Dipping | 1.5 | 1.0 | 400 |
| Example 18 | Polystyrene | Toluene (500) | LiOH | 100 | Y$_2$O$_3$ | 15 | Dipping | 1.5 | 3.0 | 500 |
| Example 19 | Polyvinyl acetate | Toluene (500) | LiClO$_4$ | 300 | TiO$_2$ | 10 | Spinning | 2 | 2.0 | 300 |
| Example 20 | Polyvinyl acetate | Toluene (500) | LiF | 100 | TiO$_2$ | 10 | Spinning | 4 | 2.0 | 700 |

*Each amount represents weight % based on the organic polymeric resin.

As apparently seen from Table 3, each of the electrochromic display elements of this invention was confirmed to be drivable at a low voltage and rapid in response speed.

In addition, in each of the electrochromic diplay elements of this invention, a clear deep blue pattern is displayed by application of a voltage so as to make negative on the display electrode side, and the displayed was found to be a display element which was good in response characteristic by driving at a low voltage. The response time is a time required before reaching the contrast ratio of 3 when a volage of 1.5 V was applied.

Comparative Examples 3 to 5 employ the composite materials as solid electrolytes without addition of a plasticizer, which, however, correspond to the embodiments according to some of Examples 1 to 20 of the invention.

TABLE 4

| | Solvent (Amount, wt. %)* | Organic polymeric resin | Ion-conductive material | | Plasticizer | Amount (wt. %) | White pigment | Amount (wt. %) | Film thickness ($\mu$) | Driving voltage | Response (msec) |
|---|---|---|---|---|---|---|---|---|---|---|---|
| | | | | Amount (wt. %) | | | | | | | |
| Example 21 | MIBK | Polymethyl methacrylate | LiClO$_4$ | 100 | Polyethylene glycol 200 | 100 | Titanium dioxide | 100 | 2.0 | 1.5 | 400 |
| | | | | | | | | | 2.0 | 1.5 | 300 |
| Example 22 | Toluene | Polystyrene | LiClO$_4$ | 80 | Polyethylene glycol 200 | 10 | Titanium dioxide | 100 | | | |
| Example 23 | MIBK | Polymethyl methacrylate | LiClO$_4$ | 150 | Polyethylene glycol 200 | 100 | — | — | 1.8 | 1.5 | 250 |
| Example 24 | MIBK | Polymethyl methacrylate | LiOH | 200 | Polyethylene glycol 200 | 100 | — | — | 1.5 | 1.5 | 300 |
| Example 25 | Toluene | Polystyrene | LiClO$_4$ | 100 | Polyethylene glycol 200 | 10 | — | — | 1.5 | 1.5 | 200 |
| Comparative example 3 | MIBK | Polymethyl methacrylate | LiClO$_4$ | 100 | — | — | Titanium dioxide | 100 | 2.0 | 1.5 | 600 |
| Comparative example 4 | MIBK | Polymethyl methacrylate | LiClO$_4$ | 150 | — | — | — | — | 1.8 | 1.5 | 700 |
| Comparative example 5 | Toluene | Polystyrene | LiClO$_4$ | 100 | — | — | — | — | 1.5 | 1.5 | 500 |

*Each added in amount of 1000% by weight based on the organic polymeric resin.

EXAMPLES 26 TO 35

Prepared were another 10 kinds of electrochromic display elements according to this invention and two kinds of comparative electrochromic display elements as shown in Table 5 in the same manner as in Examples 1 to 10 and Comparative Examples 1 and 2, except that MoO$_3$ was used in place of WO$_3$ for the electrochromic material layer.

For the respective electrochromic display elements obtained in the the above Examples 26 to 35 and Comparative Examples 6 and 7, the voltages and response times required for the contrast ratio [ratio of absorbance at the time of color formation by He-Ne laser (633 nm) to absorbance at the time of extinction] of 3 were examined. The results are shown together in Table 5.

As apparently seen from Table 5, the electrochromic display elements of Comparative Examples are slow in response speed under a high driving voltage because they have thick electrolyte layers, as contrasted to those of the present invention, each of which was confirmed to be drivable at a low voltage and rapid in response speed.

In addition, in each of the electrochromic diplay elements of this invention, a clear deep gray pattern is displayed by application of a voltage so as to make negative on the display electrode side, and the displayed pattern is extinguished by application of a voltage of the opposite polarity.

Further, the electrochromic element of this invention is free from generation of hydrogen, etc. because of absence of side reactions at the electrodes, thus being confirmed to be electrochemically stable.

TABLE 5

| | Organic polymeric resin | Organic solvent | Inorganic ion-conductive material | | Formation conditions | | Driving voltage (V) | Response time (msec) |
|---|---|---|---|---|---|---|---|---|
| | | | Kind | Amount* | Coating method | Film thickness ($\mu$m) | | |
| Example 26 | Polymethyl methacrylate | Methyl isobutyl ketone | LiClO$_4$ | 100 | Dipping | 2 | 2.2 | 750 |
| Example 27 | Polymethyl methacrylate | Methyl isobutyl ketone | " | 300 | Spinning | 2 | 1.6 | 550 |
| Example 28 | Polymethyl methacrylate | Methyl isobutyl ketone | LiOH | 50 | Spray | 0.8 | 3.0 | 950 |
| Example 29 | Polymethyl methacrylate | Methyl isobutyl ketone | LiF | 10 | " | 0.5 | 3.0 | 750 |
| Example 30 | Polymethyl methacrylate | Methyl isobutyl ketone | LiI | 10 | " | 0.5 | 2.0 | 450 |
| Example 31 | Polystyrene | Toluene | LiClO$_4$ | 100 | Spinning | 1 | 2.0 | 650 |
| Example 32 | " | " | " | 300 | Dipping | 4 | 3.0 | 650 |
| Example 33 | Polyvinyl | " | " | 300 | Spray | 0.3 | 1.6 | 350 |

TABLE 5-continued

| | Organic polymeric resin | Organic solvent | Inorganic ion-conductive material | | Formation conditions | | Driving voltage (V) | Response time (msec) |
|---|---|---|---|---|---|---|---|---|
| | | | Kind | Amount* | Coating method | Film thickness (μm) | | |
| Example 34 | acetate Methyl methacrylate-methacrylic acid copolymer | " | " | 100 | Roller | 1.5 | 2.0 | 550 |
| Example 35 | Methyl methacrylate-methacrylic acid copolymer | " | " | 300 | Spinning | 1.5 | 2.0 | 450 |
| Comparative example 6 | NAFION | — | — | — | — | 50 | 6.0 | 3500 |
| Comparative example 7 | " | — | — | — | — | 30 | 5.0 | 3000 |

*Each amount represents weight % based on the organic polymeric resin.

EXAMPLES 36 TO 45

Prepared were further 10 kinds of electrochromic display elements as shown in Table 6 in the same manner as in Examples 11 to 20, except that $MoO_3$ was used in place of $WO_3$ for the electrochromic material layer.

pattern is extinguished by application of a voltage of the opposite polarity.

Further, the electrochromic element of this invention is free from generation of hydrogen, etc. because of absence of side reactions at the electrodes, thus being confirmed to be electrochemically stable.

TABLE 6

| | Organic polymeric resin | Organic solvent (Amount*) | Inorganic ion-conductive material | | Pigment | | Forming conditions | | Driving voltage (V) | Response time (msec) |
|---|---|---|---|---|---|---|---|---|---|---|
| | | | Kind | Amount* | Kind | Amount* | Coating method | Film thickness | | |
| Example 36 | Polymethyl methacrylate | Methyl ethyl ketone (500) | LiClO$_4$ | 100 | TiO$_2$ | 20 | Spinning | 2 | 2.5 | 650 |
| Example 37 | Polymethyl methacrylate | Methyl ethyl ketone (1000) | " | 300 | ZrO$_2$ | 30 | " | 1 | 1.6 | 500 |
| Example 38 | Polymethyl methacrylate | Methyl ethyl ketone (1000) | LiI | 50 | Y$_2$O$_3$ | 30 | " | 1 | 2.0 | 900 |
| Example 39 | Methyl methacrylate-methacrylic acid copolymer | Methyl ethyl ketone (400) | LiOH | 80 | TiO$_2$ | 20 | Roller | 3 | 2.5 | 700 |
| Example 40 | Methyl methacrylate-methacrylic acid copolymer | Methyl ethyl ketone (1000) | LiI | 40 | TiO$_2$ | 10 | " | 2 | 2.0 | 650 |
| Example 41 | Polystyrene | Toluene (2000) | LiF | 100 | ZrO$_2$ | 10 | Dipping | 1.2 | 1.6 | 700 |
| Example 42 | " | " (1000) | LiClO$_4$ | 200 | ZrO$_2$ | 20 | " | 1.6 | 1.2 | 400 |
| Example 43 | " | " (500) | LiOH | 100 | Y$_2$O$_3$ | 15 | " | 1.6 | 3.0 | 500 |
| Example 44 | Polyvinyl acetate | " (500) | LiClO$_4$ | 300 | TiO$_2$ | 10 | Spinning | 2 | 2.3 | 350 |
| Example 45 | Polyvinyl acetate | " (500) | LiF | 100 | TiO$_2$ | 10 | " | 4 | 2.0 | 700 |

*Each amount represents weight % based on the organic polymeric resin.

For each of the electrochromic display elements obtained in the above Examples 36 to 45, the voltage and the response time required for a contrast ratio of 3 were examined. The results are shown together in Table 6.

As apparently seen from Table 6, each of the electrochromic display elements of this invention was confirmed to be drivable at a low voltage and rapid in response speed.

In addition, in each of the electrochromic diplay elements of this invention, a clear deep gray pattern is displayed by application of a voltage so as to make negative on the display electrode side, and the displayed

EXAMPLES 46 TO 50

Prepared were electrochromic display elements according to this invention and comparative electrochromic display elements as shown in Table 7 in the same manner as in Examples 21 to 25 and Comparative Examples 3 to 5, except that $MoO_3$ was used in place of $WO_3$ for the electrochromic material layer. The electrochromic elements thus obtained were tested for actuation characteristics to give the results which are also shown in Table 7. Each of the elements obtained was found to be a display element which was good in response characteristic by driving at a low voltage. The response time is a time required before reaching the contrast ratio of 3 when a volage of 1.5 V was applied.

Comparative Examples 8 to 10 employ the composite materials as solid electrolytes without addition of a plasticizer, which, however, correspond to the embodiments according to some of Examples 26 to 45 of the invention.

TABLE 7

|  | Solvent (Amount*, wt. %) | Organic polymeric resin | Ion-conductive material Amount (wt. %) | | Plasticizer Amount (wt. %) | | White pigment Amount (wt. %) | | Film thickness (μ) | Driving voltage | Response (msec) |
|---|---|---|---|---|---|---|---|---|---|---|---|
| Example 46 | MIBK | Polymethyl methacrylate | LiClO₄ | 100 | Polyethylene glycol 200 | 100 | Titanium dioxide | 100 | 2.0 2.0 | 1.6 1.6 | 450 350 |
| Example 47 | Toluene | Polystyrene | " | 80 | Polyethylene glycol 200 | 10 | Titanium dioxide | 100 |  |  |  |
| Example 48 | MIBK | Polymethyl methacrylate | " | 150 | Polyethylene glycol 200 | 100 | — | — | 1.8 | 1.6 | 300 |
| Example 49 | MIBK | Polymethyl methacrylate | LiOH | 200 | Polyethylene glycol 200 | 100 | — | — | 1.5 | 1.6 | 300 |
| Example 50 | Toluene | Polystyrene | LiClO₄ | 100 | Polyethylene glycol 200 | 10 | — | — | 1.5 | 1.6 | 250 |
| Comparative example 8 | MIBK | Polymethyl methacrylate | " | 100 | — | — | Titanium dioxide | 100 | 2.0 | 1.6 | 600 |
| Comparative example 9 | " | Polymethyl methacrylate | " | 150 | — | — | — | — | 1.8 | 1.6 | 700 |
| Comparative example 10 | Toluene | Polystyrene | " | 100 | — | — | — | — | 1.5 | 1.6 | 500 |

*Each added in amount of 1000% by weight based on the organic polymeric resin.

We claim:

1. An electrochromic display element comprising
   (a) a first layer consisting essentially of an electrochromic material comprising a transition metal oxide, and
   (b) a second layer in contact with said first layer, said second layer consisting essentially of (i) a light-transmissive organic polymeric resin and (ii) an inorganic material which is ion-conductive.

2. The electrochromic display element according to claim 1, wherein said transition metal oxide is selected from the group consisting of tungsten oxide, molybdenum oxide and titanium oxide.

3. The electrochromic display element according to claim 1, wherein said organic polymeric resin is at least one of the resins selected from the group consisting of polystyrene, polyvinyl chloride, a vinyl chloride/vinyl acetate copolymer, polyvinyl acetate, polyvinyl acetal, phenol resin, epoxy resin, alkyd resin, acrylic resin, polyacrylonitrile, butadiene type synthetic rubber and polyolefin.

4. The electrochromic display element according to claim 3, wherein said organic polymeric resin is polystyrene, polyvinyl acetate or acrylic resin.

5. The electrochromic display element according to claim 4, wherein said acrylic resin is polymethylmethacrylate or a methyl methacrylate/methacrylic acid copolymer.

6. The electrochromic display element according to claim 1, wherein said inorganic ion-conductive material is at least one selected from the group consisting of lithium fluoride, lithium iodide, lithium hydroxide, lithium perchlorate, sodium fluoride, sodium iodide, sodium hydroxide and sodium perchlorate.

7. The electrochromic display element according to claim 6, wherein said inorganic ion-conductive material is formulated in an amount of 0.01 to 1000% by weight based on the organic polymeric resin.

8. The electrochromic display element according to claim 7, wherein said inorganic ion-conductive material is formulated in an amount of 20 to 100% by weight based on the organic polymeric resin.

9. The electrochromic display element according to claim 1, wherein said ion-conductive material layer further contains a plasticizer and/or a pigment.

10. The electrochromic display element according to claim 9, wherein said plasticizer is at least one selcted from the group consisting of tricresyl phosphate, tributyl phosphate, triethyl phosphate, trioctyl phosphate, trisdichloropropyl phosphate, tributoxyethyl phosphate, methylacetyl ricinoleate, octyldecyl phthalate, butyllauryl phthalate, butylphthalyl butylglycolate, butylbenzyl phthalate, dilauryl phthalate, dibutyl phthalate, cyclohexyl phthalate, diethyl phthalate, diisobutyl phthalate, diisodecyl phthalate, dioctyl phthalate, dioctyl adipate, diisodecyl adipate, octyldecyl adipate, dibutyl sebacate, tributyl citrate, acetyltributyl citrate, triethyl citrate, acetyltriethyl citrate, di-2-ethylhexyl maleate, dibutyl fumarate and polyethylene glycol.

11. The electrochromic display element according to claim 10, wherein said plasticizer is polyethylene glycol.

12. The electrochromic display element according to claim 11, wherein the amount of said plasticizer is within the range of from 1 to 100% by weight based on the polymeric resin.

13. The electrochromic display element according to claim 12, wherein the amount of said plasticizer is within the range of from 5 to 70% by weight based on the polymeric resin.

14. The electrochromic display element according to claim 9, wherein said pigment is at least one selected from the group consisting of white pigments such as titanium dioxide, aluminum oxide, magnesium oxide, zirconium oxide, yttrium oxide, tantalum pentaoxide and silicon dioxide, and coloring pigment such as nickel titanium yellow, cadmium yellow, chromium yellow, cadmium red, molybdenum orange and colcothar.

15. The electrochromic display element according to claim 14, wherein said pigment is titanium dioxide, zirconium oxide or yttrium oxide.

16. The electrochromic display element according to claim 14, wherein said pigment is formulated in an amount of 5 to 50% by weight based on the organic polymeric resin.

17. The electrochromic display element according to claim 16, wherein said pigment is formulated in an amount of 10 to 30% by weight based on the organic polymeric resin.

* * * * *